(12) United States Patent
Botosan et al.

(10) Patent No.: US 6,471,613 B1
(45) Date of Patent: Oct. 29, 2002

(54) TRANSMISSION WITH VARIABLE LINE PRESSURE

(75) Inventors: Valentin Botosan, Rochester; Berthold Martin, Shelby Township, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 140 days.

(21) Appl. No.: 09/644,788

(22) Filed: Aug. 23, 2000

(51) Int. Cl.[7] .............................................. F16H 61/30
(52) U.S. Cl. ..................................... 475/120; 475/127
(58) Field of Search ................................ 475/120, 127; 477/156, 158, 159, 161, 162

(56) References Cited

U.S. PATENT DOCUMENTS

| | | | | |
|---|---|---|---|---|
| 4,388,845 A | * | 6/1983 | Kishi et al. ................ | 477/156 |
| 4,506,564 A | * | 3/1985 | Coutant ...................... | 477/158 |
| 5,074,167 A | * | 12/1991 | Yoshimura et al. ......... | 477/161 |
| 5,113,984 A | | 5/1992 | Benford ...................... | 192/3.3 |
| 5,131,294 A | * | 7/1992 | Yoshimura .................. | 477/158 |
| 5,458,545 A | * | 10/1995 | Adam et al. ................ | 477/161 |
| 5,468,198 A | | 11/1995 | Holbrook et al. ........... | 477/143 |
| 5,655,994 A | * | 8/1997 | Jang et al. .................. | 477/131 |
| 5,842,950 A | * | 12/1998 | Tsutsui et al. .............. | 477/158 |
| 6,022,293 A | | 2/2000 | Dourra et al. .............. | 477/158 |

* cited by examiner

*Primary Examiner*—Sherry Estremsky
(74) *Attorney, Agent, or Firm*—Thomas A. Jurecko

(57) ABSTRACT

A unique regulator valve arrangement is provided for an automatic transmission which provides variable line pressure. The line pressure is actively regulated through the regulator valve configuration with a variable force solenoid. The arrangement allows line pressure to be maintained at a minimal value according to a given condition while avoiding clutch slip.

4 Claims, 4 Drawing Sheets

```
┌──────────────────────────────────────────┐
│ PROVIDING A TRANSMISSION WITH A PLANETARY │
│ GEAR SYSTEM HAVING A PLURALITY OF CLUTCH  │──╭ 150
│ ELEMENTS TO ALTER THE TORQUE RATIO OF THE │
│ TRANSMISSION, SAID TRANSMISSION INCLUDING │
│ INPUT AND OUTPUT SPEED SENSORS TO DETERMINE│
│ SLIP                                      │
└──────────────────────────────────────────┘
                    ↓
┌──────────────────────────────────────────┐
│ PROVIDING A HYDRAULIC FLUID SOURCE       │──╭ 152
└──────────────────────────────────────────┘
                    ↓
┌──────────────────────────────────────────┐
│ PROVIDING A PRESSURE REGULATING DEVICE TO │
│ PROVIDE SIGNAL PRESSURE TO THE PRESSURE   │──╭ 154
│ REGULATING VALVE AND THEREFORE ESTABLISH THE│
│ DESIRED LINE PRESSURE                     │
└──────────────────────────────────────────┘
                    ↓
┌──────────────────────────────────────────┐
│ ACTIVELY ACTUATING THE PRESSURE REGULATING│
│ DEVICE ACCORDING TO SAID INPUT AND OUTPUT │──╭ 156
│ SPEED SENSORS TO MAINTAIN THE MINIMAL LINE│
│ PRESSURE SUFFICIENT TO AVOID CLUTCH SLIP  │
└──────────────────────────────────────────┘
```

FIG. 4

TRANSMISSION WITH VARIABLE LINE PRESSURE

FIELD OF THE INVENTION

The present invention relates generally to a hydraulic control system used in an automatic transmission for a vehicle, and more particularly to a pressure control configuration for regulating line pressure in the hydraulic control system.

BACKGROUND

A conventional automatic transmission used in vehicles generally includes a multi-stage gear mechanism, a torque converter connected thereto, and a plurality of clutch elements actuated by hydraulic pressure for selecting one of the gears of the gear mechanism. A hydraulic control system for an automatic transmission operates by selectively supplying hydraulic pressure from a hydraulic pump to the clutch elements by a plurality of control valves such that shifting may be realized automatically according to the driving situation.

The hydraulic control system generally includes a hydraulic fluid source, a line pressure controller for regulating hydraulic pressure supplied from the fluid source to line pressure, and a hydraulic pressure distributor for determining a hydraulic flow path corresponding to the respective transmission speeds according to the hydraulic pressure from the shift controller and suitably distributing the operational pressure to each friction element.

In traditional automatic transmissions, the line pressure is usually maintained at two different levels while in the "Drive" position. The first pressure remains constant while in first and second gears, and depending on application is around 135 psi. When the transmission shifts from second to third, the pressure lowers to around 85 psi depending on the application. The pressure remains at that pressure as the transmission shifts to fourth gear.

It would be desirable to provide a transmission that had the ability to vary the line pressure according to an optimal running condition. For example, in some conditions it would be favorable to run the transmission at a lower pressure while in the higher gears. If a lower line pressure can be maintained without inducing clutch slip, the longevity of the transmission as well as the fuel economy of the vehicle would be increased. Similarly, it may be desired to increase the line pressure in a low gear situation where clutch holding torque capacity is needed. A variable pressure configuration would allow the transmission to operate at an optimal pressure according to the condition and avoid relying on two predetermined pressures.

SUMMARY OF THE INVENTION

It is an object of the present invention to provide a hydraulic control system for an automatic transmission including a planetary gear system having a plurality of clutch elements to alter the torque ratio of the transmission.

It is another object of the present invention to provide a line pressure control device for variably regulating hydraulic pressure supplied from the fluid source.

It is yet another object of the present invention to provide a line pressure regulating valve influenced by a solenoid which is in communication with the transmission control module which is using signals from the input and output sensors as well as engine throttle angle.

It is a further object of the present invention to provide a line pressure control device for regulating hydraulic pressure which provides increased fuel economy and transmission life.

It is still another object of the present invention to replace the multitude of parts comprising a traditional regulator valve with one single valve.

The present invention obtains these and other objects by providing a new configuration for a regulator valve in an automatic transmission. The configuration according to this invention includes a first fluid port communicating with the manual valve, a second fluid port communicating with the fluid pump and a third fluid port influenced by a solenoid communicating with the fluid pump. The solenoid is energized according to the desired line pressure needed for a given situation. The solenoid is actuated accordingly to achieve the lowest line pressure available avoiding clutch slip. By maintaining line pressure at an optimal level, the durability of the transmission components as well as the fuel efficiency of the vehicle is increased.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1a is a table illustrating the applied clutches for each gear ratio of the transmission according to the principles of the present invention.

FIG. 4 is a view of the general steps of the preferred method of the present invention.

DETAILED DESCRIPTION OF THE PREFERRED EMBODIMENTS

Figure 1:
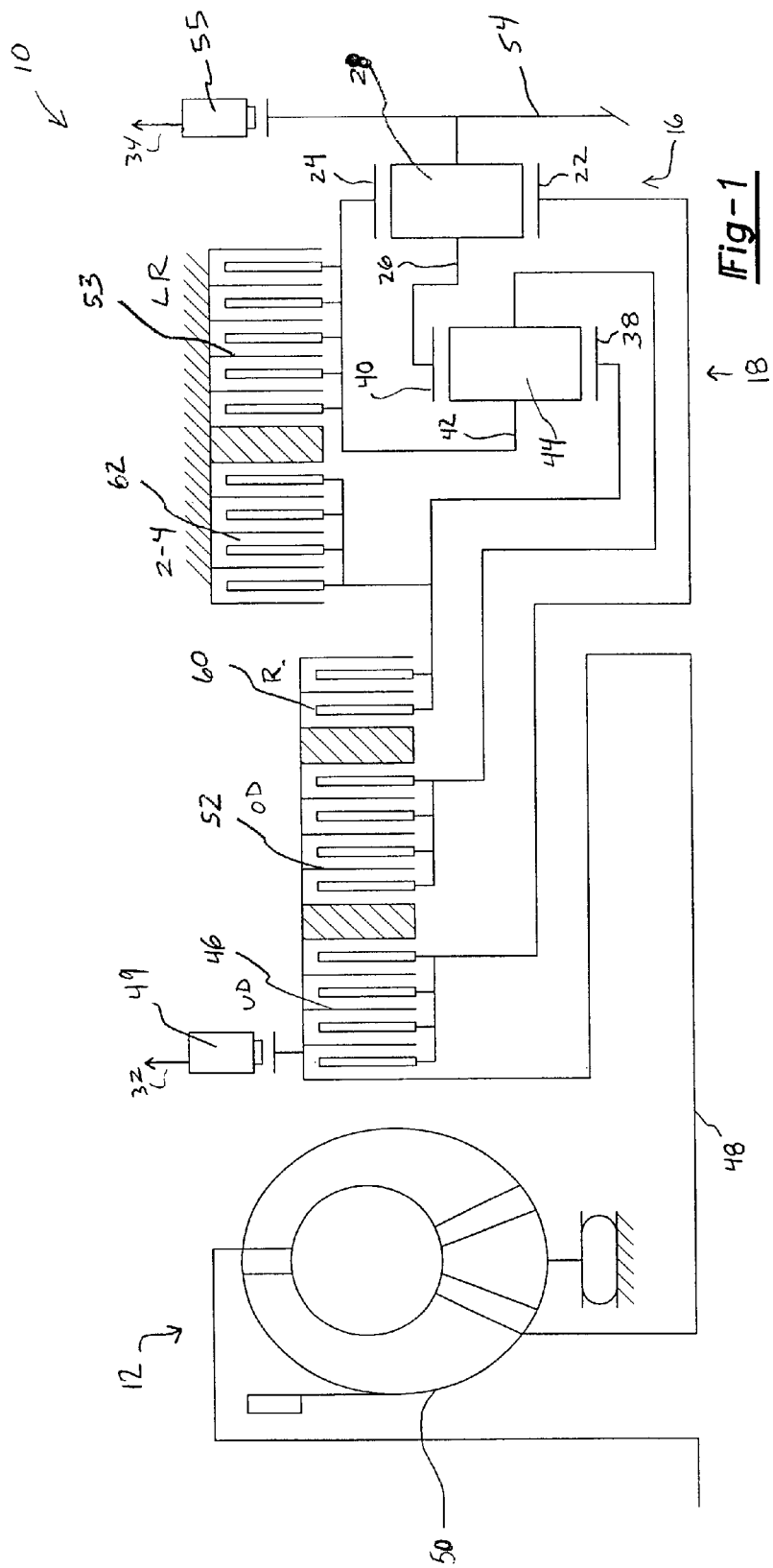
FIG. 1 is a schematic view of the hydraulic control system of the automatic transmission according to the principles of the present invention.

With reference to FIG. 1, a four-speed automatic transmission 10 is shown, according to the principles of the present invention. The automatic transmission 10 includes a torque converter 12 which is operably connected to a multiple planetary gear system. The multiple planetary gear system includes a first planetary gear assembly 16, and a second planetary gear assembly 18. The first planetary gear assembly 16 includes a sun gear 22, an annulus gear 24, a planetary carrier assembly 26, and a plurality of rotatably mounted planetary gears 28. The second planetary gear assembly 18 includes a sun gear 38, an annulus gear 40, a planetary carrier assembly 42, and a plurality of rotatably mounted planetary gears 44.

The sun gear 22 of the first planetary gear assembly 16 is selectively driven by engagement of an underdrive clutch 46 with an input shaft 48 which is driven by a turbine 50 of the torque converter 12. The annulus gear 24 of the first planetary gear assembly 16 is attached to the planetary carrier 42 of the second planetary gear assembly 18. Both of these elements are selectively engaged by an overdrive clutch 52 which engages the annulus gear 24 of first planetary gear assembly 16, and the planetary carrier 42 of the second planetary gear assembly 18 to the input shaft 48. The planetary carrier 26 of the first planetary gear assembly 16 is attached to an output shaft 54 and is also attached to the annulus gear 40 of the second planetary gear assembly 18. A reverse clutch 60 operably connects the sun gear 38 of the second planetary gear assembly 18 to the input shaft 48. A 2-4 brake 62 is provided to engage the sun gear 38 of the second planetary gear assembly 18 to the transmission housing 63. A low/reverse brake 53 is provided to engage the annulus gear 24 of the first planetary gear assembly 16 and the planetary carrier 42 of the second planetary gear assembly 18 to the housing 63.

FIG. 1A illustrates the different operating modes of the automatic transmission, as shown in FIG. 1. In particular, in order to obtain a reverse gear operation, the reverse clutch 60 and low/reverse brake 53 must be applied. In order to provide improved neutral-to-reverse shift quality, the low/reverse brake 53 is applied in neutral. In order to obtain first gear, the underdrive clutch 46 and the low/reverse brake 53 must be applied. In order to obtain second gear, the underdrive clutch 46 and the 2-4 brake 62 must be applied. In order to obtain direct gear ($3^{rd}$), the underdrive clutch 46 and the overdrive clutch 52 must be applied. In order to obtain overdrive ($4^{th}$), the overdrive clutch 52 and the 2-4 clutch must be applied.

Figure 2:
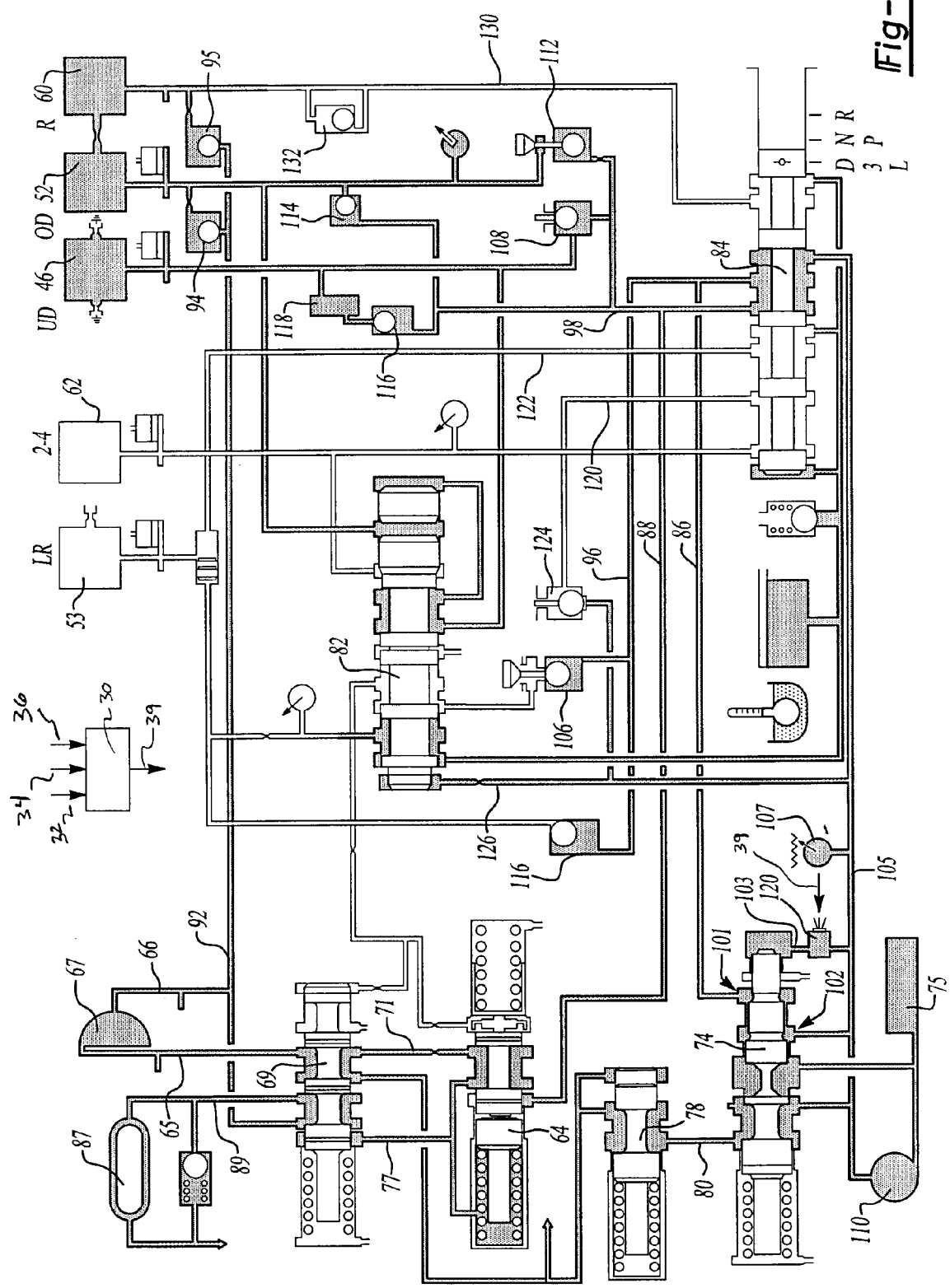
FIG. 2 is a schematic view of the hydraulic control system of the automatic transmission in drive "D" position according to the principles of the present invention.
Figure 3:
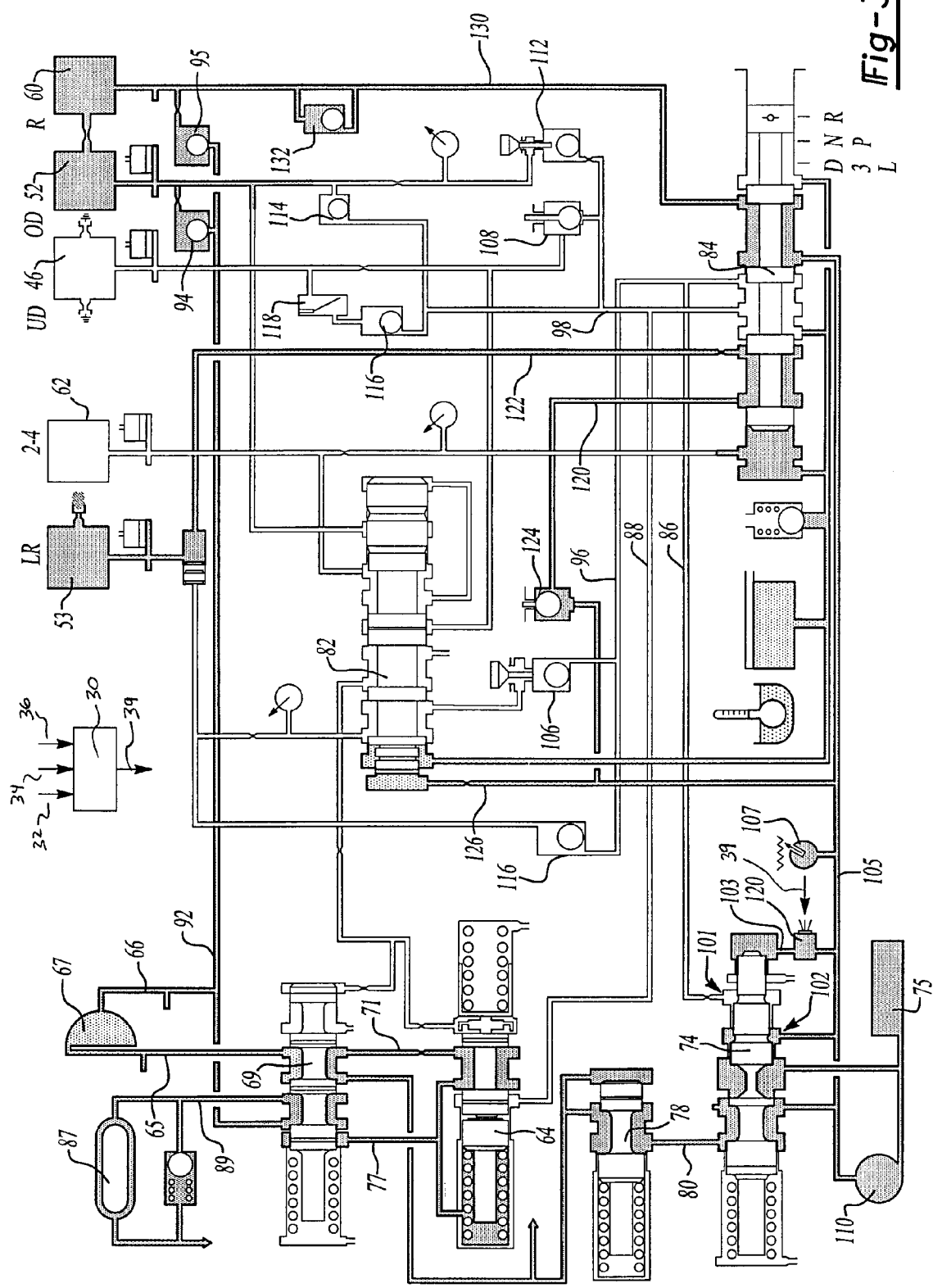
FIG. 3 is a schematic view of the hydraulic control system of the automatic transmission in reverse "R" position according to the principles of the present invention.

Turning now to FIGS. 2 and 3, the hydraulic control system 70 for controlling the operation of transmission 10 will now be described. When the manual valve is in the drive "D" position (FIG. 2), the regulator valve 74 distributes hydraulic fluid 75 under pressure to the torque converter limit valve 78 via fluid passage 80. Fluid is also open to the solenoid switch valve 82 and to the manual valve 84 via passage 105 and 86 respectively. The torque converter limit valve 78 communicates fluid to the torque converter switch valve 69 via passage 127. The regulator valve 74 has a first fluid port 101 communicating with the manual valve 84 via passage 86, a second fluid port 102 communicating with the hydraulic fluid pump 110 and a third fluid port 103 influenced by a variable force solenoid 120 communicating with the hydraulic fluid pump 110 and the manual valve 84 via passage 105. A pressure transducer 107 monitors and measures the pressure at all times. The variable force solenoid 120 is actuated to establish the desired line pressure for optimum running conditions and it is based on the information obtained at the input shaft 48 and output shaft 54 by the input speed sensor 49 and output speed sensor 55 respectively. The signals 32 and 34 from speed sensors 49 and 55 are received by a powertrain control module 30. The powertrain control module uses the information along with a signal 36 obtained from the engine regarding throttle angle and torque to generate and send a signal 39 to the variable force solenoid 120. The variable force solenoid 120 maintains the appropriate fluid pressure at the end of the regulator valve 74 to vary supply line pressure at an optimal level according to the given situation. For example, when the vehicle is under minimal loading conditions, it is desirable to run the transmission at a reduced line pressure. As such, based on the optimum desired line pressure, the variable force solenoid 120 is energized and signal pressure is supplied to the regulator valve 74 at fluid port 103. This results in the reduction of line pressure. Similarly, when the vehicle is under a high loading condition, the transmission could undergo clutch slip realized through speed sensors 49 and 55. In this situation, the variable force solenoid 120 would not provide any signal pressure at port 103. This provides an increased line pressure.

Pressurized fluid is delivered to the torque converter control valve 64 via passage 88. The torque converter control valve 64 communicates pressurized fluid to the torque converter switch valve 69 via hydraulic passage 71. The torque converter switch valve 69 communicates pressurized fluid to the torque converter clutch 67 via passage 65. Hydraulic fluid is also communicated between the torque converter clutch 67 and the torque converter switch valve 69 via passage 66. Fluid is also communicated from torque converter switch valve 69 to ball check valves 94 and 95 through passage 92. Ball check valves 94 and 95 allow fluid to flow to overdrive clutch 52 and reverse clutch 60 accordingly.

Hydraulic fluid is communicated between the torque converter control valve 64 and the torque converter switch valve 69 via passage 77. Hydraulic fluid is communicated between the torque converter switch valve 69 and a cooler device 87 via passage 89. The hydraulic fluid from the cooler 87 is communicated back to the pump 110 via passage 91 (not specifically shown).

Hydraulic fluid is delivered to the passages 86, 96, 88, 98 and 105 from manual valve 84. Passage 86 communicates the regulator valve 74 to the manual valve 84. Passage 96 communicates fluid to normally closed solenoid 106 and ball check valve 116. Passage 88 communicates fluid to converter clutch control valve 64 while passage 98 transmits fluid through normally open solenoid 108 that returns fluid to the solenoid switch valve 82 as well as communicates fluid to the underdrive clutch 46. Passage 98 also allows fluid to flow through normally closed solenoid 112 to overdrive clutch 52. In addition, passage 98 delivers fluid through ball check valve 116 and temperature controller 118 to underdrive clutch 46.

Turning now to FIG. 3, the transmission is shown with the manual valve 84 in the reverse "R" position. To obtain reverse gear, the reverse clutch 60 and the low reverse clutch 53 must be applied. The regulator valve 74 distributes hydraulic fluid under pressure to the torque converter limit valve 78 via fluid passage 80. Fluid is also open to port 102 which communicates with the pump 110 and the manual valve 84 via passage 105. The variable force solenoid 120 is closed preventing fluid from flowing through port 103. Fluid also communicates with the solenoid switch valve 82 via passage 126. Passage 126 allows fluid to travel past ball check valve 124 through passage 120 and to the manual valve 84. Fluid travels from the manual valve 84 through passage 130, communicating with open ball check valve 132, to apply reverse clutch 60. Fluid also travels through passage 122 from the manual valve 84 to apply the low reverse clutch 53.

Referring now to FIG. 4, in a first general step 150 the preferred method of the present invention provides a transmission 10 with a planetary gear system 16, 18 having a plurality of clutch elements to alter the torque ratio of the transmission, the transmission including input and output speed sensors 49 and 55.

In a second general step 152, the preferred method of the present invention provides a hydraulic fluid source 75.

In a third general step 154, the preferred method of the present invention provides a pressure regulating device 120 to supply signal pressure at the pressure regulating valve 74.

In a fourth general step 156, the preferred method of the present invention the pressure regulating device 120 is actively actuated to attain and maintain the minimal line pressure sufficient to avoid clutch slip.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic control system for an automatic transmission including a planetary gear system having a plurality of clutch elements to alter the torque ratio of the transmission, said hydraulic control system comprising:

a hydraulic fluid pump;

a hydraulic fluid source;

a manual valve selectively movable between a plurality of positions and communicating with said hydraulic fluid source, said plurality of positions including reverse and drive; and a line pressure control device for variably regulating hydraulic pressure supplied from said fluid source to line pressure, said line pressure control device includes a line pressure regulating valve, a solenoid for actuating said pressure regulating valve, and a pressure sensing device, wherein said line pressure regulating valve includes a first fluid passage communicating with said hydraulic fluid pump and said solenoid.

2. The hydraulic control system according to claim 1, wherein said line pressure regulating valve includes a second fluid passage communicating with said manual valve.

3. The hydraulic control system according to claim 2, wherein said line pressure regulating valve includes a third fluid passage communicating with said hydraulic fluid pump.

4. The hydraulic control system according to claim 1, wherein said line pressure control device variably regulates said hydraulic pressure between 39 and 165 psi.

* * * * *